(12) United States Patent
Schlote et al.

(10) Patent No.: US 7,914,280 B2
(45) Date of Patent: Mar. 29, 2011

(54) COMBUSTION METHOD AND APPARATUS

(75) Inventors: Andrew Schlote, Fenton, MO (US); Phil Gerard Langhorst, St. Louis, MO (US)

(73) Assignee: Innovative Energy, Inc., Fenton, MO (US)

( * ) Notice: Subject to any disclaimer, the term of this patent is extended or adjusted under 35 U.S.C. 154(b) by 539 days.

(21) Appl. No.: 11/568,957

(22) PCT Filed: May 19, 2005

(86) PCT No.: PCT/US2005/017834
§ 371 (c)(1),
(2), (4) Date: Jan. 11, 2008

(87) PCT Pub. No.: WO2005/114050
PCT Pub. Date: Dec. 1, 2005

(65) Prior Publication Data
US 2008/0166672 A1    Jul. 10, 2008

Related U.S. Application Data

(60) Provisional application No. 60/572,541, filed on May 19, 2004, provisional application No. 60/640,687, filed on Dec. 30, 2004.

(51) Int. Cl.
*F23C 5/32* (2006.01)
*F23C 5/02* (2006.01)

(52) U.S. Cl. ............... 431/9; 431/8; 431/10; 431/11; 431/116; 431/158; 110/213; 110/260; 110/261; 110/262

(58) Field of Classification Search ............... 431/8, 9, 431/10, 11, 115, 116, 158, 173, 350, 353; 110/213, 260–262, 244, 251, 264, 346; 60/39.464, 39.5, 39.55, 751
See application file for complete search history.

(56) References Cited

U.S. PATENT DOCUMENTS 233,065 A * 10/1880 Burnap .................. 431/353
(Continued)

FOREIGN PATENT DOCUMENTS

DE           DT197709           9/1977
(Continued)

OTHER PUBLICATIONS

Supplementary European Search Report from corresponding European Patent Application No. 05750085, (Dec. 28, 2007).

*Primary Examiner* — Steven B McAllister
*Assistant Examiner* — Daniel E Namay
(74) *Attorney, Agent, or Firm* — Thompson Coburn LLP

(57) ABSTRACT

A method comprises providing a combustion apparatus having an outer vessel and an inner conduit. The outer vessel has a first wall that defines an internal volume. The inner conduit is at least partially positioned within the internal volume and provides a fluid passageway that is in communication therewith. The method further comprises introducing oxygen into the internal volume in a manner such that the oxygen swirls within the internal volume and around the inner conduit. Furthermore, the method comprises introducing fuel into the internal volume, and combusting the fuel and oxygen at least partially therewithin. The combustion of the fuel and oxygen produces reaction products and the method further comprises discharging at least some of the reaction products from the internal volume via the fluid passageway of the inner conduit.

3 Claims, 8 Drawing Sheets

U.S. PATENT DOCUMENTS

| | | | | |
|---|---|---|---|---|
| 1,331,061 | A | * | 2/1920 | Harding .................. 219/206 |
| 1,331,856 | A | * | 2/1920 | Summbers ................ 123/549 |
| 1,334,473 | A | * | 3/1920 | Assche ...................... 431/208 |
| 1,366,242 | A | * | 1/1921 | Caldwell ..................... 48/102 A |
| 2,003,181 | A | * | 5/1935 | Lucich .......................... 239/128 |
| 2,090,568 | A | * | 8/1937 | Andler ............................... 431/9 |
| 2,097,255 | A | * | 10/1937 | Saha .................................. 431/9 |
| 2,357,302 | A | | 9/1944 | Kerr et al. |
| 2,707,444 | A | | 5/1955 | Van Loon |
| 2,725,950 | A | | 12/1955 | Christiansen |
| 2,787,318 | A | * | 4/1957 | Wolfersperger ................ 431/9 |
| 2,882,843 | A | * | 4/1959 | Powell ........................ 431/116 |
| 2,889,871 | A | * | 6/1959 | Voorheis ........................ 431/9 |
| 2,924,938 | A | * | 2/1960 | Herbert ...................... 60/39.23 |
| 3,039,406 | A | | 6/1962 | Aref |
| 3,187,799 | A | * | 6/1965 | Nesbitt .............................. 431/9 |
| 3,265,113 | A | * | 8/1966 | Thurley et al. ................ 431/238 |
| 3,326,262 | A | | 6/1967 | Weller et al. |
| 3,478,706 | A | | 11/1969 | Carson |
| 3,500,775 | A | * | 3/1970 | Hubbard ...................... 110/244 |
| 3,642,061 | A | * | 2/1972 | Waeselynck .................. 165/111 |
| 3,720,497 | A | * | 3/1973 | Arenson ........................ 431/114 |
| 3,736,094 | A | * | 5/1973 | Shisler ........................... 431/158 |
| 3,848,550 | A | | 11/1974 | Bowen |
| 3,861,330 | A | | 1/1975 | Santoleri |
| 3,868,210 | A | * | 2/1975 | Simpson et al. .................. 431/4 |
| 4,000,978 | A | * | 1/1977 | Henrie ............................. 422/109 |
| 4,008,041 | A | * | 2/1977 | Roffe et al. .................... 392/397 |
| 4,021,188 | A | * | 5/1977 | Yamagishi et al. ........... 431/158 |
| 4,089,631 | A | | 5/1978 | Giles |
| 4,091,747 | A | | 5/1978 | Chase |
| 4,113,425 | A | * | 9/1978 | von Linde et al. .............. 431/352 |
| 4,148,356 | A | * | 4/1979 | Cramer ........................... 165/111 |
| 4,159,000 | A | | 6/1979 | Iwasaki et al. |
| 4,169,583 | A | * | 10/1979 | Cramer ........................... 266/122 |
| 4,202,170 | A | * | 5/1980 | Meyer .......................... 60/39.23 |
| 4,302,177 | A | * | 11/1981 | Fankhanel et al. ............... 431/11 |
| 4,334,919 | A | * | 6/1982 | Queneau et al. .................. 75/414 |
| 4,429,538 | A | * | 2/1984 | Sato et al. ........................ 60/748 |
| 4,586,894 | A | * | 5/1986 | Wunning ....................... 431/158 |
| 4,606,720 | A | * | 8/1986 | Harvey ......................... 431/115 |
| 4,681,533 | A | | 7/1987 | Petersen et al. |
| 4,973,459 | A | * | 11/1990 | Lippert et al. ........... 423/244.01 |
| 5,014,631 | A | * | 5/1991 | Ikeda et al. ..................... 110/264 |
| 5,015,171 | A | | 5/1991 | Zinn et al. |
| 5,024,170 | A | | 6/1991 | Santanam et al. |
| 5,209,187 | A | * | 5/1993 | Khinkis ........................ 122/136 R |
| 5,394,937 | A | * | 3/1995 | Nieh ............................... 165/156 |
| 5,462,430 | A | * | 10/1995 | Khinkis .......................... 431/10 |
| 5,727,378 | A | * | 3/1998 | Seymour ......................... 60/804 |
| 6,210,149 | B1 | | 4/2001 | Plavnik et al. |
| 6,289,676 | B1 | * | 9/2001 | Prociw et al. .................... 60/740 |
| 6,513,318 | B1 | | 2/2003 | Wright |
| 6,684,823 | B1 | * | 2/2004 | Plavnik et al. ................. 122/379 |
| 6,862,877 | B1 | * | 3/2005 | James ......................... 60/39.464 |
| 7,047,894 | B2 | * | 5/2006 | Crafton et al. ................. 110/344 |
| 7,229,279 | B2 | * | 6/2007 | Wahl et al. ..................... 431/261 |
| 7,273,015 | B2 | * | 9/2007 | Crafton et al. ................. 110/342 |
| 2001/0015160 | A1 | | 8/2001 | Brunnmair et al. |
| 2002/0192608 | A1 | | 12/2002 | Flament et al. |
| 2003/0013059 | A1 | * | 1/2003 | Dutescu et al. ................. 431/202 |
| 2003/0033808 | A1 | | 2/2003 | Schlote |
| 2003/0177768 | A1 | | 9/2003 | Pellizzari |
| 2004/0081929 | A1 | * | 4/2004 | Kim .................................. 431/9 |
| 2005/0106517 | A1 | * | 5/2005 | Okada et al. ........................ 431/9 |
| 2010/0146939 | A1 | * | 6/2010 | Sim et al. .......................... 60/286 |

FOREIGN PATENT DOCUMENTS

| | | |
|---|---|---|
| DE | 19518787 A1 | 11/1996 |
| EP | 0525734 | 2/1993 |
| EP | 0905447 A2 | 3/1999 |
| GB | 2052032 A | 1/1981 |
| GB | 2150277 B * | 1/1987 |
| GB | 2256470 A | 12/1992 |
| JP | 02010001 A * | 1/1990 |
| WO | 96/10716 A1 | 4/1996 |
| WO | 0060225 | 10/2000 |
| WO | WO 00/60225 * | 12/2000 |

* cited by examiner

COMBUSTION METHOD AND APPARATUS

This application claims the benefit of the priority date of copending U.S. Provisional Application Ser. No. 60/572,541 filed May 19, 2004, entitled COMBUSTION METHOD AND APPARATUS, and of copending U.S. Provisional Application Ser. No. 60/640,687 filed Dec. 30, 2004, entitled COMBUSTION METHOD AND APPARATUS.

SUMMARY OF THE INVENTION

In a first aspect of the invention, a method comprises the step of providing a combustion apparatus. The combustion apparatus comprises an outer vessel, an inner conduit, and an ash port. The outer vessel has a first longitudinally extending wall that defines an internal volume of the outer vessel. The inner conduit provides a fluid passageway that is in communication with the internal volume of the outer vessel. The ash port provides a fluid passageway that is in communication with the internal volume of the outer vessel. The method also comprises a step of introducing fuel and oxygen into the combustion apparatus in a manner such that the fuel and oxygen swirl within the internal volume of the outer vessel of the combustion apparatus. Furthermore, the method comprises a step of combusting the fuel and oxygen at least partially within the internal volume of the outer vessel of the combustion apparatus. The combustion of the fuel and oxygen produces gaseous and solid reaction products and the method further comprises a step of discharging at least some of the gaseous and solid reaction products from the internal volume of the outer vessel of the combustion apparatus via the fluid passageway of the inner conduit. The reaction products discharged from the inner conduit have a first mass ratio of solid reaction products to gaseous reaction products. Still further, the method comprises a step of discharging at least some of the gaseous and solid reaction products from the internal volume of the outer vessel of the combustion apparatus via the fluid passageway of the ash port. The reaction products discharged from the ash port have a second mass ratio of solid reaction products to gaseous reaction products. The second mass ratio of solid reaction products to gaseous reaction products is greater than the first mass ratio of solid reaction products to gaseous reaction products.

In another aspect of the invention, a method comprises a step of providing a combustion apparatus. The combustion apparatus comprises an outer vessel, an inner conduit, and a shroud. The outer vessel has a first longitudinally extending wall that defines an internal volume of the outer vessel. The inner conduit provides a first fluid passageway that is in communication with the internal volume of the outer vessel. The shroud at least partially surrounds the outer vessel in a manner defining a second fluid passageway between the shroud and the first longitudinally extending wall of the outer vessel. The method also includes a step of introducing fuel and oxygen into the combustion apparatus in a manner such that the fuel and oxygen swirl within the internal volume of the outer vessel of the combustion apparatus, and a step of combusting the fuel and oxygen at least partially within the internal volume of the outer vessel of the combustion apparatus. The combustion of the fuel and oxygen produces reaction products and the method also comprises a step of discharging at least some of the reaction products from the internal volume of the outer vessel of the combustion apparatus via the first fluid passageway of the inner conduit. Still further, the method comprises a step of passing fluid through the second fluid passageway in a manner that cools the first longitudinally extending wall of the outer vessel.

In yet another aspect of the invention, a method comprises a step of providing a combustion apparatus. The combustion apparatus comprises an outer vessel, an inner conduit, and a jacket. The outer vessel has a first longitudinally extending wall that defines an internal volume of the outer vessel. The inner conduit provides a first fluid passageway that is in communication with the internal volume of the outer vessel. The jacket at least partially surrounds the outer vessel in a manner defining at least a second fluid passageway between the jacket and the first longitudinally extending wall of the outer vessel. The second fluid passageway extends spirally around the first longitudinally extending wall of the outer vessel. The method also comprises a step of passing oxygen through the second fluid passageway and into the internal volume of the outer vessel and introducing fuel into the internal volume of the outer vessel. Additionally, the method comprises a step of combusting the fuel and oxygen at least partially within the internal volume of the outer vessel of the combustion apparatus. The combustion of the fuel and oxygen produces reaction products and the method further comprises discharging at least some of the reaction products from the internal volume of the outer vessel of the combustion apparatus via the first fluid passageway of the inner conduit.

In yet another aspect of the invention, a method comprises a step of providing a combustion apparatus. The combustion apparatus comprises an outer vessel, an inner conduit, and fuel inlet conduit. The outer vessel has a first longitudinally extending wall that defines an internal volume of the outer vessel. The inner conduit provides a first fluid passageway that is in communication with the internal volume of the outer vessel. The fuel inlet conduit defines a second fluid passageway that is in communication with the internal volume of the outer vessel. The method further comprises steps of introducing oxygen into the combustion apparatus in a manner such that the oxygen swirls within the internal volume of the outer vessel of the combustion apparatus, heating liquid oil in the second fluid passageway of the fuel inlet conduit in a manner causing at least some of the liquid oil to vaporize and thereby transform into oil vapor, discharging the oil vapor from the fuel inlet conduit into the internal volume of the outer vessel, and combusting the oil and oxygen at least partially within the internal volume of the outer vessel of the combustion apparatus. The combustion of the oil and oxygen produces reaction products and the method further comprises a step of discharging at least some of the reaction products from the internal volume of the outer vessel of the combustion apparatus via the first fluid passageway of the inner conduit.

In yet another aspect of the invention, a method comprises a step of providing a combustion apparatus. The combustion apparatus comprises an outer vessel, an inner conduit, and a gas permeable liner. The outer vessel has a first longitudinally extending wall that defines an internal volume of the outer vessel. The inner conduit provides a first fluid passageway that is in communication with the internal volume of the outer vessel. The gas permeable liner is at least partially positioned within the inner conduit in a manner spaced from the inner conduit such that a generally annular second fluid passageway exists between the inner conduit and the gas permeable liner. The method further comprises steps of introducing fuel and oxygen into the internal volume of the outer vessel, and combusting the fuel and oxygen at least partially within the internal volume of the outer vessel of the combustion apparatus. The combustion of the fuel and oxygen produces reaction products. Additionally, the method comprises a step of discharging at least some of the reaction products from the internal volume of the outer vessel of the combustion apparatus via the first fluid passageway of the inner conduit. Still further, the method comprises a step of forcing gaseous matter through the gas permeable liner from the second fluid passageway and into the first fluid passageway in a manner limiting the amount of heat absorbed by the inner conduit.

In yet another aspect of the invention, a method comprises a step of providing a combustion apparatus. The combustion apparatus comprises an outer vessel, an inner conduit, a feed fluid inlet, and a fuel inlet. The outer vessel has a first longitudinally extending wall that defines an internal volume of the outer vessel. The inner conduit provides a first fluid passageway that is in communication with the internal volume of the outer vessel. The feed fluid inlet defines a second fluid passageway that is in fluid communication with the internal volume of the outer vessel. The fuel inlet comprises an annular ring that comprises an annular fluid channel and a plurality of openings. Each of the openings faces radially inward and creates a fluid path between the annular channel and the second fluid passageway of the feed fluid inlet. The method also comprises steps of introducing oxygenated fluid into the feed fluid inlet, and introducing fuel into the second fluid passageway of the feed fluid inlet through the openings of the annular ring of the fuel inlet from the annular fluid channel of the annular ring in a manner such that the fuel mixes with the oxygenated fluid in the feed fluid inlet. Furthermore, the method comprises steps of introducing the fuel and the oxygen into the internal volume of the outer vessel from the feed fluid inlet in a manner such that the oxygen swirls within the internal volume of the outer vessel of the combustion apparatus, and combusting the fuel and oxygen at least partially within the internal volume of the outer vessel of the combustion apparatus. The combustion of the fuel and oxygen produces reaction products and the method further comprises a step of discharging at least some of the reaction products from the internal volume of the outer vessel of the combustion apparatus via the first fluid passageway of the inner conduit.

In yet another aspect of the invention, a method comprises a step of providing a combustion apparatus. The combustion apparatus comprises an outer vessel and an inner conduit. The outer vessel has a longitudinally extending wall that defines an internal volume of the outer vessel. The inner conduit is at least partially positioned within the internal volume of the outer vessel and provides a first fluid passageway that is in communication with the internal volume of the outer vessel. The method further comprises a step of introducing oxygen into the internal volume of the outer vessel at a flow rate of at least fifty feet per second and in a manner such that the oxygen swirls within the internal volume of the outer vessel of the combustion apparatus and around the inner conduit. Furthermore, the method comprises steps of introducing fuel into the internal volume of the outer vessel, and combusting the fuel and oxygen at least partially within the internal volume of the outer vessel of the combustion apparatus. The combustion of the fuel and oxygen produces reaction products and the method further comprises a step of discharging at least some of the reaction products from the internal volume of the outer vessel of the combustion apparatus via the first fluid passageway of the inner conduit.

In yet another aspect of the invention, a method comprises a step of providing a combustion apparatus. The combustion apparatus comprises an outer vessel and an inner conduit. The outer vessel has a first longitudinally extending wall that defines an internal volume of the outer vessel. The inner conduit is at least partially positioned within the internal volume of the outer vessel and provides a fluid passageway that is in communication with the internal volume of the outer vessel. The method further comprises a step of introducing oxygen into the internal volume of the outer vessel at a flow rate of at least fifty feet per second and in a manner such that the oxygen swirls within the internal volume of the outer vessel of the combustion apparatus and around the inner conduit. Furthermore, the method comprises steps of introducing fuel into the internal volume of the outer vessel, and combusting the fuel and oxygen at least partially within the internal volume of the outer vessel of the combustion apparatus. The combustion of the fuel and oxygen produces reaction products and the method further comprises a step of discharging at least some of the reaction products from the internal volume of the outer vessel of the combustion apparatus via the first fluid passageway of the inner conduit. Still further, the method comprises a step of providing a turbine and a generator. The turbine comprising a rotor that is operatively connected to the generator and the method further comprises a step of utilizing such reaction products to rotate the rotor and to thereby drive the generator.

In yet another aspect of the invention, a combustion apparatus comprises an outer vessel, an inner conduit, and a shroud. The outer vessel comprises a first longitudinally extending wall that extends generally along a central axis and that defines an internal volume of the outer vessel. The outer vessel further has a forward end and a rearward end. The rearward end is longitudinally spaced from the forward end. At least a portion of the outer vessel is gas permeable. The inner conduit comprises an intake port and at least partially defines a first fluid passageway that is in communication with the internal volume of the outer vessel through the intake port. The intake port is positioned between the forward end and the rearward end of the outer vessel. The first fluid passageway extends through the rearward end of the outer vessel. The shroud comprises a second longitudinally extending wall that circumscribes the first longitudinally extending wall of the outer vessel in a spaced-apart manner defining a second fluid passageway between the shroud and the first longitudinally extending wall of the outer vessel.

In yet another aspect of the invention, a combustion apparatus comprises an outer vessel, an inner conduit, and at least one spiral fluid passageway. The outer vessel comprises a first longitudinally extending wall that extends generally along a central axis and that defines an internal volume of the outer vessel. The outer vessel further has a forward end and a rearward end. The rearward end is longitudinally spaced from the forward end. The inner conduit comprises an intake port and at least partially defines a first fluid passageway that is in communication with the internal volume of the outer vessel through the intake port. The intake port is positioned between the forward end and the rearward end of the outer vessel. The first fluid passageway extends through the rearward end of the outer vessel. The spiral fluid passageway is in fluid communication with the internal volume of the outer vessel and spirals about the central axis. The first longitudinally extending wall of the outer vessel is radially between the spiral fluid passageway and the central axis.

In yet another aspect of the invention, a combustion apparatus comprises an outer vessel, an inner conduit, and an annular gas permeable liner. The outer vessel comprises a first longitudinally extending wall that extends generally along a central axis and that defines an internal volume of the outer vessel. The outer vessel further has a forward end and a rearward end. The rearward end is longitudinally spaced from the forward end. The inner conduit circumscribes the central axis and comprising an intake port and at least partially defines a first fluid passageway that is in communication with the internal volume of the outer vessel through the intake port. The intake port is positioned between the forward end and the rearward end of the outer vessel. The first fluid passageway extends through the rearward end of the outer vessel. The gas permeable liner is positioned at least partially within the inner conduit in a spaced-apart manner such that an annular fluid passageway is formed radially between the gas permeable liner and the inner conduit with respect to the central axis.

In yet another aspect of the invention, a combustion apparatus comprises an outer vessel, an inner conduit, a feed fluid inlet, and a fuel inlet. The outer vessel comprises a first longitudinally extending wall that extends generally along a central axis and that defines an internal volume of the outer vessel. The outer vessel further has a forward end and a rearward end. The rearward end is longitudinally spaced from the forward end. The inner conduit comprises an intake port and at least partially defines a first fluid passageway that is in communication with the internal volume of the outer vessel through the intake port. The intake port is positioned between the forward end and the rearward end of the outer vessel. The first fluid passageway extends through the rearward end of the outer vessel. The feed fluid inlet defines a second fluid passageway that is in communication with the internal volume of the outer vessel. The fuel inlet comprises an annular ring that comprises an annular fluid channel and a plurality of openings. Each of the openings faces radially inward and creates a fluid path between the annular channel and the second fluid passageway of the feed fluid inlet.

Other features and advantages will be in part apparent and in part pointed out hereinafter.

BRIEF DESCRIPTION OF THE DRAWINGS

Corresponding reference characters indicate corresponding parts throughout the several drawing figures.

DETAILED DESCRIPTION OF THE PREFERRED EMBODIMENT OF THE INVENTION

Figure 1:
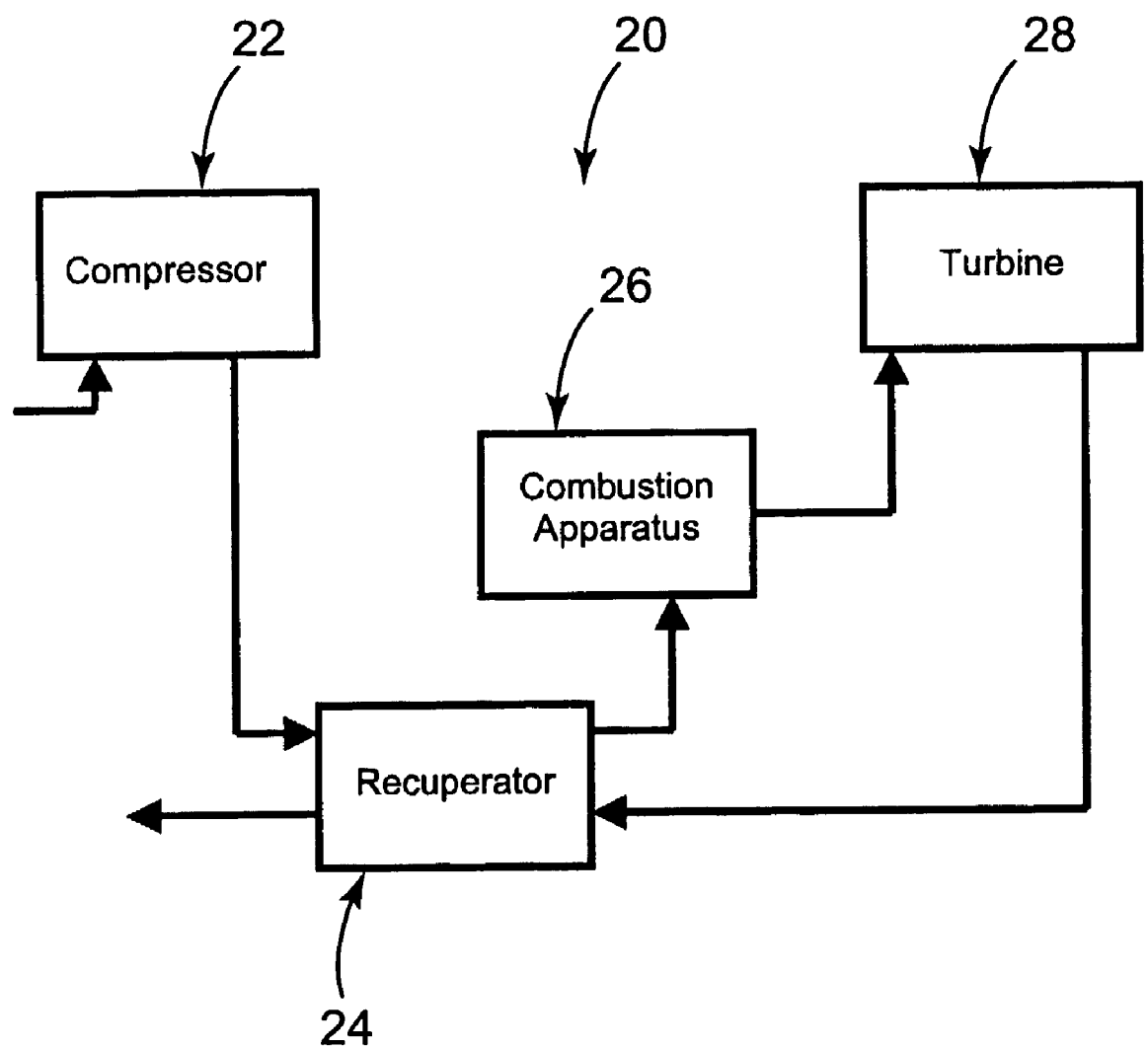
FIG. 1 is a schematic of a rotary heat engine system that utilizes a combustion apparatus in accordance with the present invention, the system comprising a compressor, a recuperator, a combustion apparatus, and a turbine.
Figure 2:
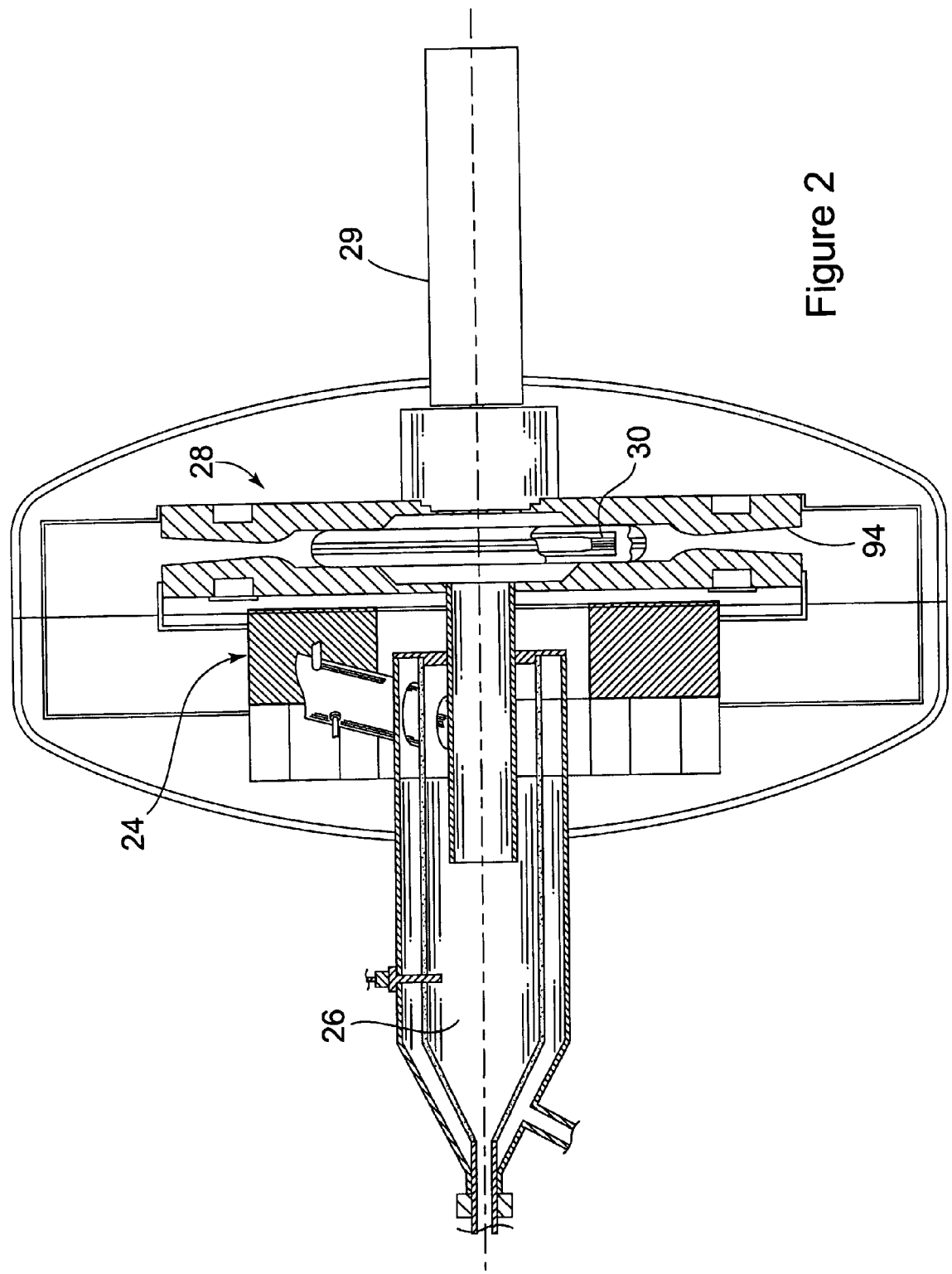
FIG. 2 is a longitudinal sectional view of the system of FIG. 1.

Referring to the drawings, and more particularly to FIGS. 1 and 2, a first embodiment of the present invention is in the form of a system, generally indicated in its entirety by the reference numeral 20. The system 20 comprises a compressor 22, a recuperator 24, a combustion apparatus 26, a turbine 28, and a generator 29. The compressor 22 is preferably a two stage intercooled supercharger and is adapted for delivering pressurized air to the combustion apparatus 26 via the recuperator 24. The turbine 28 comprises a rotor 30 and the combustion apparatus 26 is adapted to transform fuel into heat energy that is used to at least in part turn the rotor of the turbine.

Figure 3:
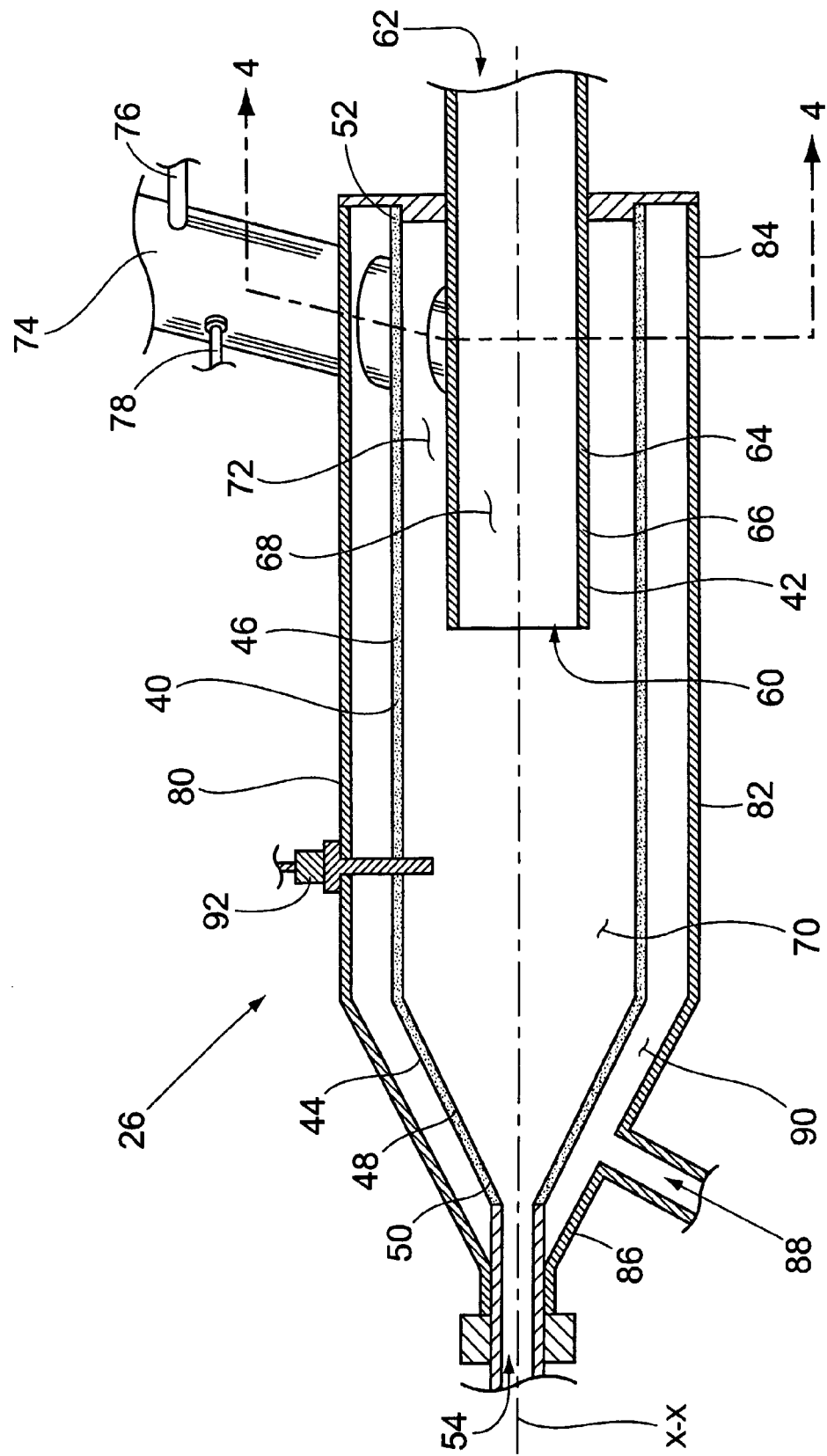
FIG. 3 is a longitudinal section view of the combustion apparatus of the system of FIGS. 1 and 2.
Figure 4:
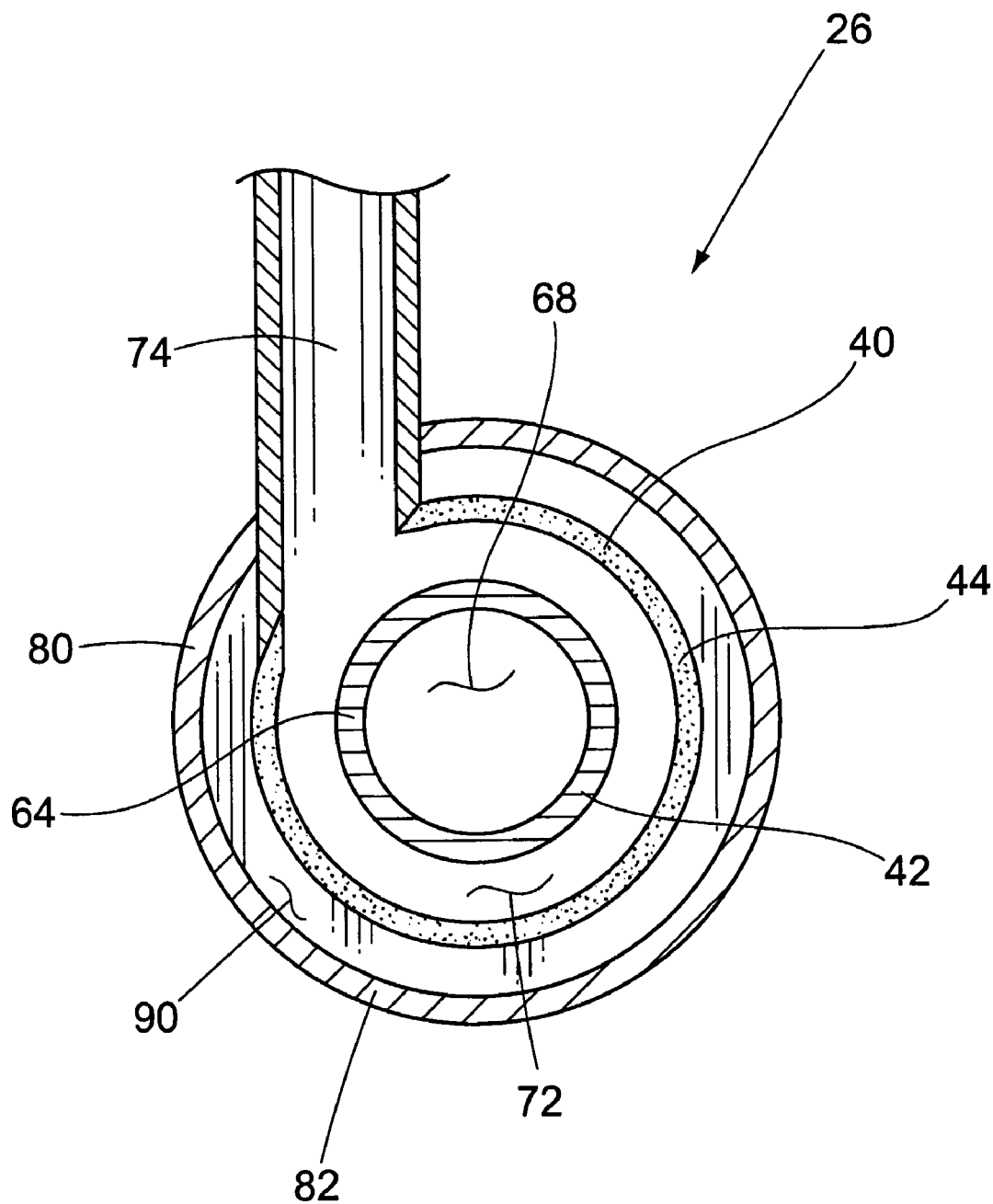
FIG. 4 is a sectional view of the combustion apparatus of FIG. 3, taken along the plane of line 4-4 of FIG. 3.

Referring to FIGS. 3 and 4, the combustion apparatus 26 preferably comprises an outer vessel 40 and an inner conduit 42. The outer vessel 40 preferably comprises a first longitudinally extending wall 44 that extends along a central axis, generally indicated as axis X-X. The first longitudinally extending wall 44 of the outer vessel 40 preferably comprises a generally cylindrical portion 46 and a generally frustoconical portion 48, and is preferably annular in cross-section when viewed perpendicular to the central axis X-X. The first longitudinally extending wall 44 of the outer vessel 40 also preferably comprises an Inconel® support wall having a plurality relatively small holes (not visible in the drawings) formed therethrough, thereby making at least a portion of the first longitudinally extending wall gas permeable, and may comprise a porous ceramic foam adhered to the inner surface of the support wall to provide thermal insulation (collectively represented by a dotted pattern in drawing figures). Additionally, it should be appreciated that the first longitudinally extending wall 44 of the outer vessel 40 could be formed as a single homogenous piece of gas permeable ceramic our could otherwise be made gas permeable. The outer vessel 40 further comprises a forward end 50 and a rearward end 52. The rearward end 52 of the outer vessel 40 is longitudinally spaced from the forward end 50. The forward end 50 of the outer vessel 40 preferably comprises an ash discharge port 54 that is axially aligned with the central axis X-X.

The inner conduit 42 preferably comprises a forward intake port 60, a rearward discharge port 62, and a second longitudinally extending wall 64, and is positioned at least partially within the outer vessel 40. The second longitudinally extending wall 64 extends generally along the central axis X-X between the intake 60 and discharge 62 ports and is preferably coaxial with the first longitudinally extending wall 44 of the outer vessel 40. Like the first longitudinally extending wall 44, the second longitudinally extending wall 64 may include a thermal insulation layer and is preferably annular in cross-section when viewed perpendicular to the central axis X-X. The second longitudinally extending wall 64 has at least a forward longitudinal portion 66 which is spaced radially inward of the first longitudinally extending wall 44. The second longitudinally extending wall 64 circumscribes a fluid passageway 68 that extends through the inner conduit 42 from the intake port 60 to the discharge port 62. As shown in FIG. 3, the intake port 60 is positioned between the forward 50 and rearward 52 ends of the outer vessel 40 and is spaced from both of the forward and rearward ends of the outer vessel. The inner conduit 42 preferably extends rearwardly beyond the rearward end 52 of the outer vessel 40 such that the discharge port 62 of the inner conduit is positioned rearward of the rearward end of the outer vessel. However, it should be appreciated that the inner conduit 42 may be completely within the outer vessel 40 without departing from the scope of this invention.

The outer vessel 40 and the inner conduit 42 at least partially define a forward combustion region 70 and a rearward fluid passageway 72. The forward combustion region 70 is at least partially circumscribed and defined by the first longitudinally extending wall 44 of the outer vessel 40 and is defined as being forward of the intake port 60 of the inner conduit 42. The rearward fluid passageway 72 is generally annular in shape and is defined as being rearward of the intake port 60 of the inner conduit 42 and radially between the first 44 and second 64 longitudinally extending walls. The rearward fluid passageway 72 and the forward combustion region 70 are in direct fluid communication with each other. Preferably, the intake port 60 of the inner conduit 42 is spaced rearwardly from the forward end 50 of the outer vessel 40 by a distance which is greater than the maximum diameter of the inner surface of the first longitudinally extending wall 44.

The combustion apparatus 30 further comprises at least one tangential feed fluid inlet 74, at least one fuel inlet 76, and one or more igniters 78. The tangential feed fluid inlet 74 extends through the outer vessel 40 and is adapted and configured to discharge fluid into the rearward fluid passageway 72 between the intake port 60 of the inner conduit 42 and the rearward end 52 of the outer vessel 40. The fluid inlet 74 is preferably circular in cross-section and is also adapted and configured such that at least some of the fluid introduced through the fluid inlet and into the rearward fluid passageway 72 swirls around the second longitudinally extending wall 64 along a spiral path (e.g., in a counterclockwise direction as viewed in FIG. 4). Furthermore, the centerline of the fluid inlet 74 may slope forward and rearward so as to introduce fluid into the rearward fluid passageway in a manner such that the fluid has a velocity component directed toward the forward combustion region 70. However, the centerline of the fluid inlet 74 may alternatively be perpendicular to the central axis X-X. The position of the fluid inlet 74 and the combined shape of the rearward fluid passageway 72 and the forward combustion region 70 cause the fluid introduced through the fluid inlet to have a uniform tornado-like effect in the rearward fluid passageway and the forward combustion region of the combustion apparatus 26. Additionally, although only one fluid inlet is shown in the drawing figures, a plurality of fluid inlets 74 can be circumferentially spaced about the central axis X-X to thereby ensure even and uniform swirling flow within the outer vessel 40. The fuel inlet 76 is configured and adapted for introducing fuel (not shown) into the forward combustion region 70. In this particular embodiment of a combustion apparatus, the fuel inlet 76 is configured and adapted to inject such fuel into the tangential feed fluid inlet 74, upstream of the rearward fluid passageway 72, and thereby indirectly introduces fuel into the forward combustion region 70. The igniters 78, which may be spark plugs, flame rods, glow plugs, arch-igniters, torch-type igniters or any other suitable mechanisms, are adapted to ignite the fuel as it passes through the tangential feed fluid inlet 74 when initially igniting combustion. After combustion has been initiated, use of the igniters 78 is not required. In this configuration, the combustion apparatus 26 is adapted to cause fuel and oxygen to mix and begin combustion in the fluid inlet 76, upstream of the of the rearward fluid passageway 72 and to further mix and combust the fuel and oxygen mixture within the rearward fluid passageway 72 and the forward combustion region 70.

The combustion apparatus 26 further comprises a shroud 80 that has a third longitudinally extending wall 82 that extends generally along the central axis X-X and that preferably has a circular cross-section relative to a plane perpendicular to the central axis X-X. The third longitudinally extending wall 82 circumscribes the first longitudinally extending wall 44 of the outer vessel 40 in a spaced apart manner and is generally concentric therewith. The rearward end 84 of the third longitudinally extending wall 82 is preferably rigidly connected to the rearward end 52 of the outer vessel 40. The forward end 86 of the third longitudinally extending wall 82 of the shroud 80 preferably tapers radially inward, in a manner similar to the frustoconical portion 48 of the first longitudinally extending wall 44 of the outer vessel 40. The discharge port 54 of the outer vessel 40 preferably extends longitudinally through the forward end 86 of the third longitudinally extending wall 82 of the shroud 80. Preferably, the forward end 86 of the third longitudinally extending wall 82 tapers to the extent that it engages with the discharge port 54 of the outer vessel 40 in a manner such that the shroud 80 radially supports the forward end 50 of the first longitudinally extending wall 44 of the outer vessel 40, but such that the forward end of the first longitudinally extending wall can axially move relative to the forward end of the third longitudinally extending wall of the shroud. The tangential feed fluid inlet 74 extends through the third longitudinally extending wall 82 of the shroud 80 and is preferably welded thereto. The shroud 80 also preferably comprises a inlet opening 88 that extends through the forward end 86 of the third longitudinally extending wall 82. The inlet opening 88 is in fluid communication with the fluid passageway 90 that extends between the outer vessel 40 and the shroud 80. Still Further, a flame sensor 92 is preferably attached to the shroud 80 and extends through the shroud and the first longitudinally extending wall 44 of the outer vessel 40 into the forward combustion region 70.

As mentioned above, this particular combustion apparatus 26 is particularly adapted for use in connection with a rotary heat engine system 20 as shown in FIGS. 1 and 2. Referring again to FIGS. 1 and 2, the turbine 34 of the system 20 is preferably a radial out-flow turbine having a rotor and a stator. More preferably, the turbine 34 is a radial out-flow turbine of the type described in U.S. Pat. No. 6,668,539, entitled Rotary Heat Engine, which is incorporated herein by reference in its entirety. The turbine 34 is preferably coupled to and powers a generator 70 in a manner to generate electrical power. However, it should be appreciated that the combustion apparatus 26 is also useful in connection with other rotary heat engines or in other applications, such as forced-air heating systems and furnaces. This being said, it should be appreciated that various aspects and operational characteristics of the combustor apparatus 26, and the other embodiments of combustion apparatus describe herein, may not be required or necessarily desirable depending on the particular use made of the combustor apparatus.

During operation, the combustion apparatus 26 causes fuel and oxygenated feed fluid to mix in the tangential feed fluid inlet 74, the rearward fluid passageway 72, and the forward combustion region 70. Additionally, the combustion apparatus 26 causes a combustion reaction of the fuel and oxygenated fluid mixture in at least the forward combustion region 70 in a manner to form combustion reaction products and causes a majority of such combustion reaction products to pass out of the combustion apparatus rearwardly through the fluid passageway 68 of the inner conduit 42. Preferably, the combustion apparatus 26 is adapted such that at least 70%, and more preferably at least 80%, and more preferably at least 90% of the fuel entering the combustion apparatus is combusted in the forward combustion region 70.

In greater detail, during operation, fluid comprising oxygen is pumped or otherwise forced into the combustion apparatus 26 through the tangential feed fluid inlet 74 and into the rearward fluid passageway 72 of the combustion apparatus in a generally tangential direction relative to the rearward fluid passageway in a manner such that at least some of the feed fluid swirls around the second longitudinally extending wall 64 of the inner conduit. As this occurs, fuel introduced through the fuel inlet 76 is mixed with the feed fluid in the fluid inlet 74. The oxygenated feed fluid may be pure oxygen, any mixture comprising the combination of oxygen and nitrogen, and any other mixture comprising oxygen, including air. The fuel may be any type of fuel which burns in the presence of oxygen, such as natural gas, gasoline, propane, #2 diesel, #6 heavy diesel, hydrogen, bio-diesel, vegetable oil, pulverized coal, liquefied coal slurry, and any other combustible material known in the art to be suitable for use in connection with combustion apparatus.

Before being introduced into the rearward fluid passageway 62 and before the fuel is mixed with the feed fluid, the feed fluid is preferably pressurized by the compressor 22 and pre-heated in the recuperator 24. The feed fluid is preferably introduced into the combustion apparatus 26 through the fluid inlet 74 at a pressure of at least 30 lbs/in$^2$ absolute (psia), and more preferably at a pressure of at least 50 psia, and even more preferably at a pressure of at least 60 psia. Additionally, the feed fluid preferably has a temperature of at least 800° F. (426° C.) as it is introduced through the feed fluid inlet 74. As it is introduced through the fluid inlet 74, the feed fluid more preferably has a temperature at least as great as the ignition temperature (i.e., the lowest temperature of a substance at which sustained combustion can be initiated) of the fuel. As an example, if methane is used as the fuel and if the methane has an ignition temperature of approximately 1100° F. (600° C.), then the feed fluid preferably has a temperature of at least 1100° F. (600° C.) as it is introduced through the fluid inlet 74. It should be appreciated that introducing the feed fluid at a temperature exceeding the fuel's ignition temperature reduces emissions. The fuel is preferably diluted with steam or cooler feed fluid prior to injected into the hot feed fluid stream. Preferably the feed fluid is introduced through the feed fluid inlet 74 and into the rearward fluid passageway 72 at a steady flow rate, as is the fuel. Preferably, when EGR is not being utilized, the feed fluid flow rate is at least twice as great as the flow rate needed for stoichiometric combustion of the fuel at the fuel flow rate. Also preferably, the feed fluid is introduced through the fluid inlet 74 at a velocity of at least 300 feet per second. However, lower flow rates may be desirable in some situations. Nonetheless, to ensure that combustion does not migrate upstream, the feed fluid flow rate is preferably at least 50 feet per second.

The shape and operation of the combustion apparatus 26 facilitate mixing of the fuel and the feed fluid in the forward combustion region 70 and the rearward fluid passageway 72. Initially, the fuel-oxygen mixture is ignited via the igniter(s) 78. However, once combustion has begun, the burning becomes continuous until the fuel and/or oxygen is no longer supplied. The combustion can be monitored via the flame sensor 92. A combustion reaction of at least some of the mixed fuel and feed fluid occurs in the combustion region 70. A combustion reaction of some of the mixed fuel and feed fluid also occurs in the rearward fluid passageway 62 and downstream of the igniter(s) 78. Preferably, at least 70% (and more preferably at least 80%, and more preferably at least 90%) of the fuel-air mixture that enters the combustion apparatus 26 is combusted in either the forward combustion region 70 or the rearward fluid passageway 72 to form combustion reaction products. The combustion reaction products are then discharged longitudinally rearward through the fluid passageway 68 of the inner conduit 42. It should be appreciated that in connection with the rotary heat engine system 20, the discharged reactions products are then preferably utilized to turn the rotor 30 of the turbine 28 to thereby drive the generator 29.

As mentioned above, combustion of some of the swirling fuel and feed fluid occurs in the combustion region 70 and forms combustion reaction products. To the extent some of the swirling fuel in the fuel-oxygen mixture at least temporarily remains unburned, the swirling nature of the flow is sufficient to cause the unburned fuel to move radially away from the central axis X-X and to cause the less dense combustion reaction products to move radially toward the central axis. This acts to minimize the amount of unburned fuel that enters the inner conduit 42.

Because of the shape of the fluid passageway 68 of the inner conduit 42, the combustion reaction products (along with any excess air) swirl in the same circumferential direction (e.g., counter-clockwise as viewed in FIG. 4) as the swirling fuel-oxygen mixture in the combustion region 70. Preferably, the intake port 60 and the fluid passageway 68 of the inner conduit 42 are sufficiently large such that the discharged combustion reaction products swirl in the fluid passageway. More preferably, the diameter of the intake port 60 of inner conduit 42 is at least half the diameter of the inner surface of the first longitudinally extending wall 44 of the outer vessel 40. The first longitudinally extending wall 44 of the combustor apparatus 26 preferably has an outer diameter of 4.0 inches and a length of 11.75 inches. The inner conduit 42 has an outer diameter of 2.5 inches and its intake port 60 is longitudinally spaced approximately 6.5 inches rearward of the forward end 50 of the first longitudinally extending wall 44. However, it is to be understood that other dimensions and other ratios may be employed without departing from this invention.

The discharge port 54 at the forward end 50 of the outer vessel 40 functions as an ash discharge outlet. In addition to gaseous reaction products resulting from combustion of the fuel-oxygen mixture, the burning of certain fuels, such as coal, produces solid reaction products. In other combustion apparatus, such solid reaction products are often filtered out of the discharged flow downstream of the combustion apparatus via a separate filtering system. However, the discharge port 54 at the forward end 50 of the outer vessel 40 allows at least a portion of such solid reaction products to be discharged from the forward combustion region 70 therethrough, rather than being discharged through the fluid passageway 68 of the inner conduit 42. More specifically, the inventor has found that the swirling nature of the flow in the combustion apparatus 26 acts to draw solid reaction particles radially outward against the first longitudinally extending wall 44 of the outer vessel 40 and toward the forward end 50 of the outer vessel, and also acts to prevent such particles from being drawn into the fluid passage 68 of the inner conduit 42. This causes solid reaction products to be forced toward the discharge port 54 at the forward end 50 of the outer vessel 40. The tapering of the frustoconical portion 48 of the first longitudinally extending wall 44 of the outer vessel 40 improves flow swirling as compared to a similar combustion apparatus having a purely cylindrical forward combustion region. The solid reaction products that are forced toward the forward end 50 of the outer vessel 40 can thereafter be discharged from the combustion apparatus 26 by a relatively small amount of bleed-off fluid drawn through the discharge port 54 from the forward combustion region 70. This flow of bleed-off fluid can be intermittent or constant and is preferably small as compared to the amount of flow being discharged through the inner conduit 42 such that it does not appreciably impact the overall efficiency of the combustion apparatus 26. Alternatively, an auger device could be utilized to remove the solid reaction products.

The shroud 80 of the combustion apparatus 26 acts to forcibly cool the outer vessel 40. Preferably gaseous fluid is forced into the fluid passageway 90 that extends between the first longitudinally extending wall 44 of the outer vessel 40 and the third longitudinally extending wall 82 of the shroud 80 via the inlet opening 88. This fluid thereafter passes through the gas permeable first longitudinally extending wall 44 of outer vessel 40, and into the forward combustion region 70 and rearward fluid passageway 72. Preferably, the gaseous fluid entering the fluid passageway 90 between the first longitudinally extending wall 44 of the outer vessel 40 and the third longitudinally extending wall 82 of the shroud 80 from the inlet opening 88 is bled off from the fluid being supplied to the fluid inlet 74 of the combustion apparatus 26 and is preferably less than three percent of the amount of fluid that enters the rearward fluid passageway 72 via the fluid inlet 74. It should be appreciated that the gaseous fluid passing through the first longitudinally extending wall 44 of the outer vessel 40 acts to efficiently cool the outer vessel.

The axially free nature of the connection between the forward end 50 of the third longitudinally extending wall 82 of the shroud 80 and the discharge port 54 of the outer vessel 40 allows the outer vessel to expand and contract without straining the shroud. This increases the useful life of the combustion apparatus 26. However, depending on the materials utilized and the particular configuration of the components, the forward end 50 of the third longitudinally extending wall 82 of the shroud 80 and the discharge port 54 of the outer vessel 40 may be axially fixed to each other without adversely affecting the useful life of the combustion apparatus.

Preferably, the rotor 30 of the rotary heat engine system 20 is configured and adapted to rotate in the same direction as the swirling combustion reaction products discharged from the fluid passageway 68 of the inner conduit 42 to thereby minimize energy losses. The combustion reaction products and any excess fluid (collectively "the outflow") discharged from the combustor apparatus 26 into the rotor 30 preferably pass through a diffuser 94 of the turbine 28 which decreases the speed of the outflow. After exiting the diffuser 94, the outflow flows through the recuperator 24 to pre-heat the feed fluid before the feed fluid is introduced into the combustion apparatus 26.

Pre-heating the feed fluid before combustion reduces energy waste. Rapid mixing of the fuel and oxygenated feed fluid and dilution of the fuel prior to such mixing also reduces NOx emissions. Rapid mixing occurs because of the high swirl velocity of the feed fluid and by finely atomizing the fuel (which promotes complete combustion). The centrifugal separation and reburning of particulate matter caused by the combustion apparatus 26 also reduces particulate matter emissions. NOx reduction is also accomplished with low temperature combustion. The configuration of the combustion apparatus 26 accommodates a near stoichiometric combustion region followed by a rapid mixing with cooler air to minimize NOx formation. To further reduce NOx formation, non-combustible matter, such as water in the form of steam or liquid or even exhaust gas, may added the fuel mixture for dilation. Water may be injected with the fuel or mixed with the fuel for dilution and the fuel mixture may be preheated, thereby breaking down the fuel in some cases before it is injected into the combustion apparatus 26. Also, oxygenation of fuel promotes more complete combustion and lowers NOx formation. Electro-static charging of fuel, especially long carbon chain fuels such as bio-diesel facilitates complete combustion and lowers NOx. Ozone generation upstream of the combustion air markedly reduces NOx formation. In landfill gas situations, enzymatic fogging may be used to lock-up sulfur and other undesirable compounds to precipitate them from the gas stream before combustion. In landfill gas clean-up, oxygenation, coagulation and magnetic separation may also be used to clean the gas sufficiently to ensure system longevity and to reduce emissions.

Unlike conventional combustors, the combustion apparatus 26 is configured to maximize "photo-combustion" (i.e., the combustion of matter resulting from the matter being heated to ignition by radiation being emitted directly from nearby burning gas). Thus, the combustion apparatus 26 does not have to rely upon heat radiating from the inner conduit 42 to heat or ignite the gaseous fluid passing along the rearward fluid passageway 72. As such, the rearward fluid passageway 72 and the inner conduit 42 can have a relatively short axial length as compared to the overall length of the first longitudinally extending wall 44 of the outer vessel 40. Additionally, the frequency of the radiation emitted from burning gas is generally higher than the infrared radiation emitted by the heated inner conduit 42 and therefore, by being configured to maximize photo-combustion, the combustor apparatus 26 can heat and ignite gaseous fluid more rapidly than conventional combustors. Moreover, as discussed above, the high velocity swirling action of the gaseous fluid within the forward combustion region 70 acts to centrifugally force cooler, and therefore denser, uncombusted matter radially outward away from the intake port 60 of the inner conduit 42. In the forward combustion region 70, the swirling uncombusted matter is immediately adjacent the hotter burning and combusted matter and thereby ultimately ignites. Upon igniting, the gaseous fluid becomes less dense and forced radially inward as a result of being displaced by cooler incoming uncombusted gaseous fluid. The decrease in the density of the combustion products, acts to increase the swirl velocity. All this results in more complete combustion and allows the time it takes gaseous fluid to pass through the combustion apparatus 26 (transit time) to be greatly reduced. The transit time of gaseous fluid in the combustion apparatus is less than one second and the combustion apparatus achieves single-digit NOx emissions.

The high speed of the gaseous fluid passing through the combustion apparatus 26 also eliminates local hotspots within the combustion apparatus and thereby improves the longevity of the combustion apparatus and eliminates the need to provide other means for preventing hotspots. Additionally, the high speed of the gaseous fluid allows premixed fuel/oxygen mixtures to be supplied to the combustion apparatus without concern for flash back. Thus, fuel and oxygen do not have to be supplied to the combustor via separate passageways.

The combustion apparatus 26 can achieve turndown ratios of 6:1 and more typically 10:1. With an inner conduit 42 diameter of two inches, the combustor apparatus 26 is capable of operating at 2000 Fahrenheit firing temperature and generating 300,000 Btu/hr.

Figure 5:
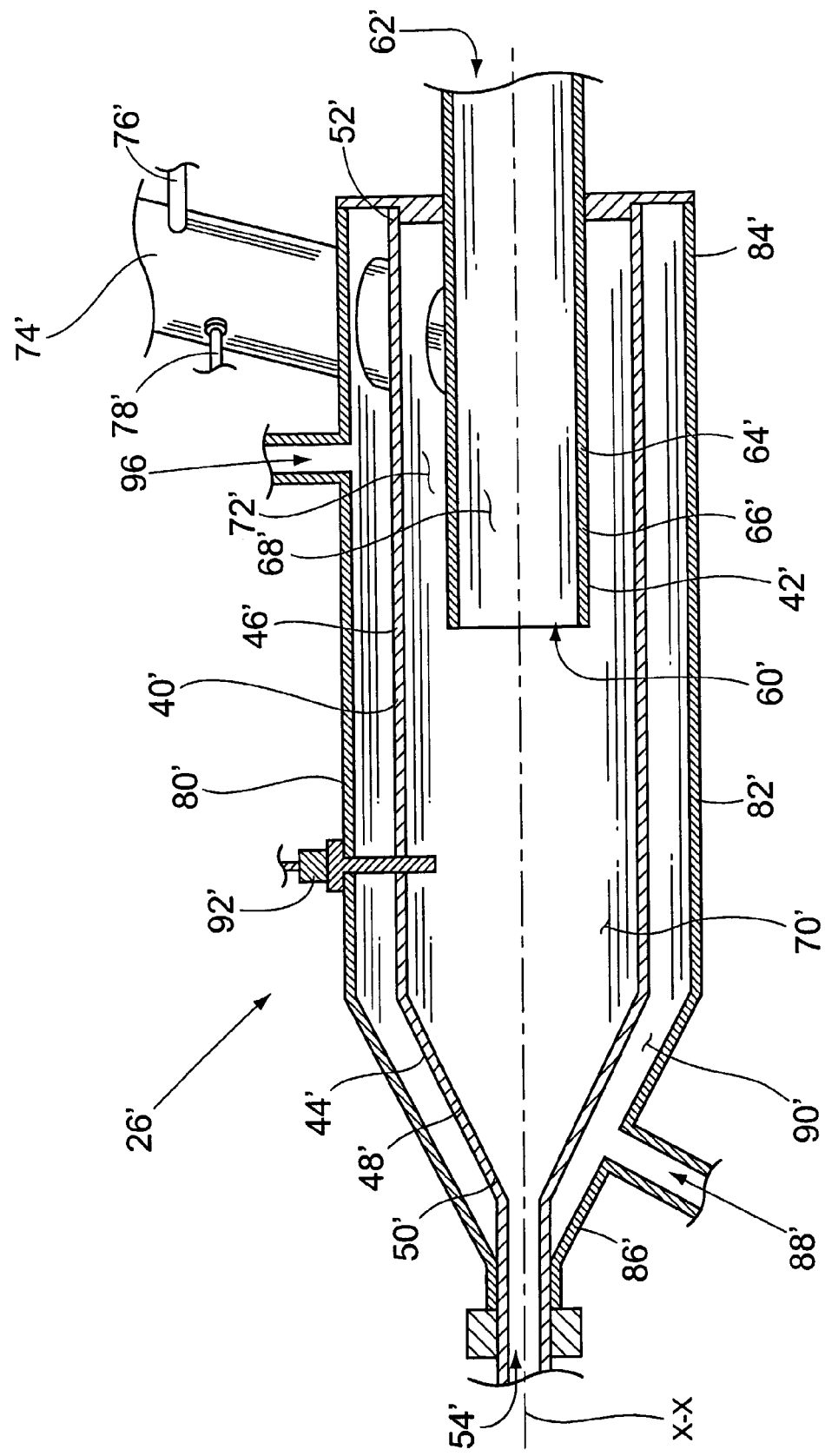
FIG. 5 is a longitudinal section view of another embodiment of a combustion apparatus in accordance with the invention.

A modification of the embodiment of the combustion apparatus 26 shown in FIGS. 3 and 4 is shown in FIG. 5 and is generally indicated by the reference numeral 26'. In the combustion apparatus 26' of this modified embodiment, the first longitudinally extending wall 44 of the outer vessel 40 is impermeable and the shroud 80 is further provided with an outlet opening 96. The combustion apparatus 26 operates essentially the same as the combustion apparatus 26 shown in FIGS. 3 and 4 except that gaseous cooling fluid entering the fluid passageway 90 between the first longitudinally extending wall 44 of the outer vessel 40 and the third longitudinally extending wall 82 of the shroud 80 from the inlet opening 88 is discharged therefrom via the outlet opening 96, rather than by passing through the first longitudinally extending wall 44 of the outer vessel 40. Nonetheless, such gaseous fluid passing through the fluid passageway 90 acts to cool the first longitudinally extending wall 44 of the outer vessel 40.

Figure 6:
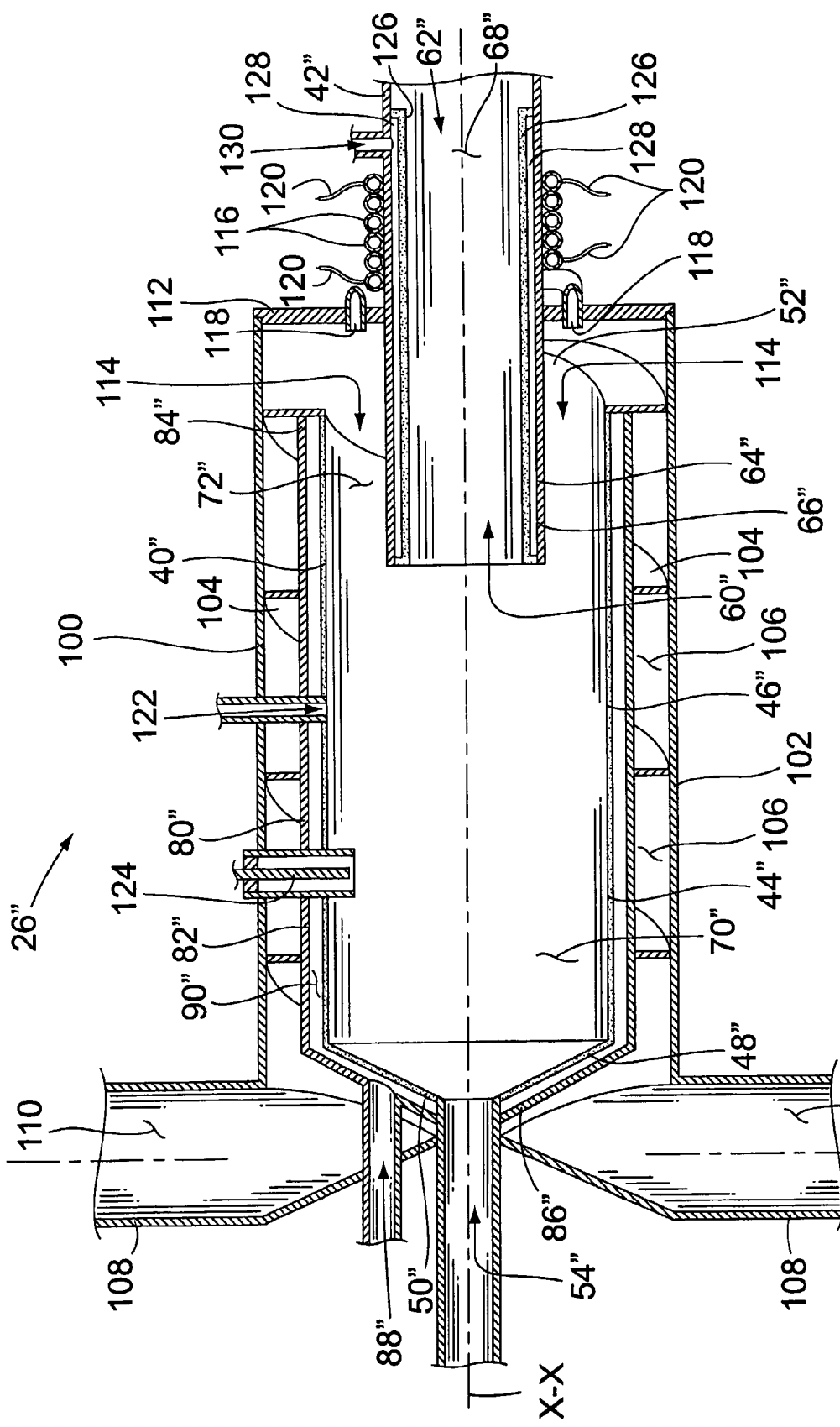
FIG. 6 is a longitudinal section view of yet another embodiment of a combustion apparatus.
Figure 7:
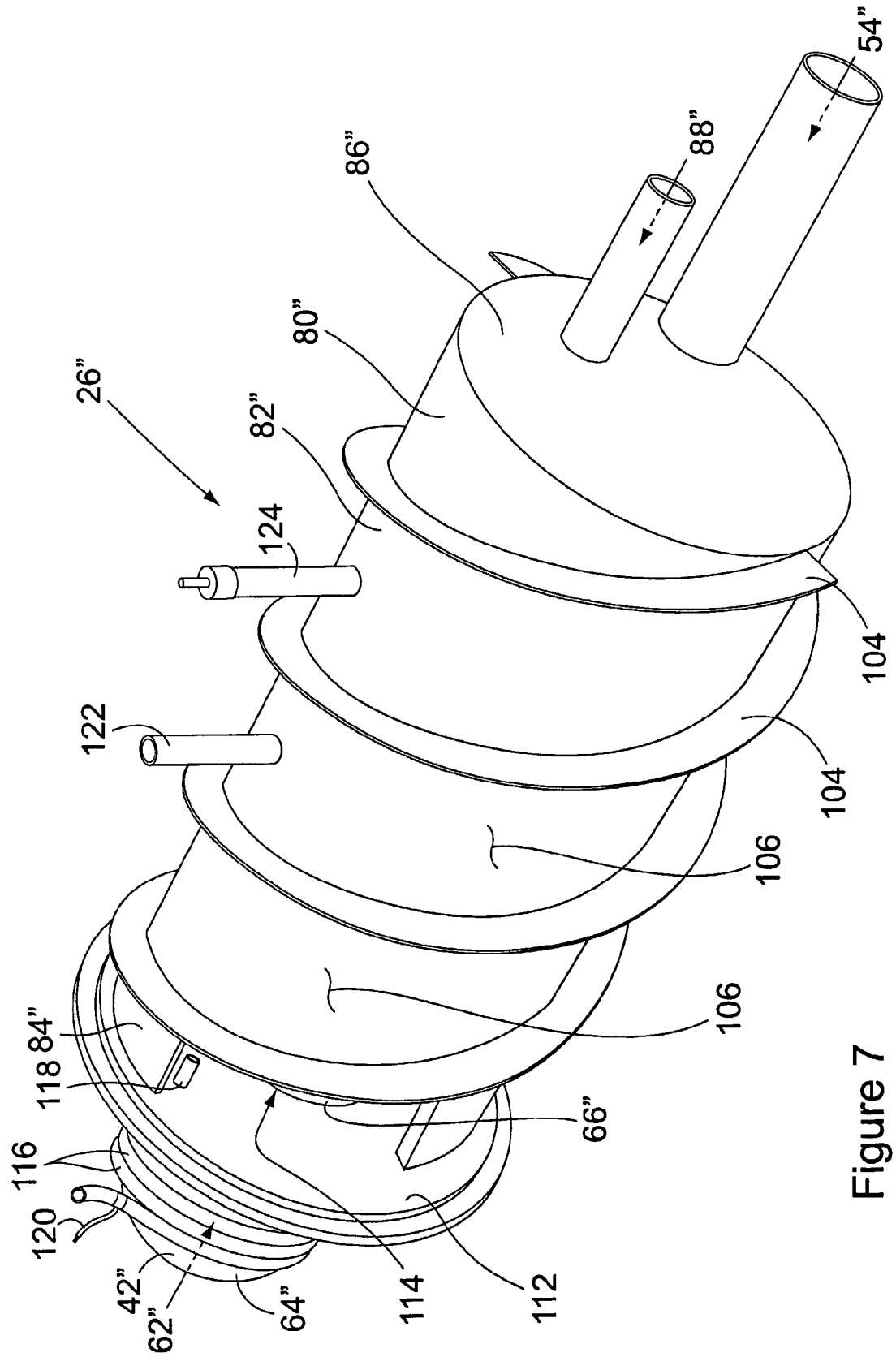
FIG. 7 is perspective view of the combustion apparatus shown in FIG. 6, and is shown with its jacket removed.

Yet another embodiment of a combustion apparatus is shown in FIGS. 6 and 7. This combustion apparatus 26" is generally similar to those described above and comprises many of the same features. Thus, it should be appreciated that the reference numerals shown in FIGS. 6 and 7 that are identical to those shown in FIGS. 3-5 correspond to similar aspects of the of the combustion apparatus described above and that the description of such aspects provided above apply equally to the combustion apparatus 26" shown in FIGS. 6 and 7.

However, unlike the combustion apparatus shown in FIGS. 3-5, the combustion apparatus 26" shown in FIGS. 6 and 7 is preferably particularly configured and adapted for use as a general purpose heat generator rather than for use in connection with a rotary heat engine. More specifically, the feed fluid supplied to this combustion apparatus 26" is preferably not preheated and is preferably supplied at a pressure much lower than that of the combustion apparatus described above.

Perhaps the most appreciable difference between the combustion apparatus 26" shown in FIGS. 6 and 7, as compared to the combustion apparatus described above, is the manner in which feed fluid is provided into the rearward fluid passageway 72. In particular, the combustion apparatus 26" comprises a jacket 100 that comprises a fourth longitudinally extending wall 102 that extends generally along the central axis X-X and that is preferably coaxial with the first longitudinally extending wall 44" of the outer vessel 40". The fourth longitudinally extending wall 102 is preferably generally cylindrical and is spaced radially outward from the shroud 80" of the combustion apparatus 26". The jacket 100 also comprises two spiral ribs 104 that spiral about the central axis X-X and that extend radially from the shroud 80" to the fourth longitudinally extending wall 102 of the jacket 100, thereby creating two generally spiral fluid passageways 106 between the fourth longitudinally extending wall and the shroud. A plurality of fluid inlet tubes 108 preferably define feed fluid passageways 110 that are each in fluid communication with the spiral fluid passageways 106. For purposes of illustration, the combustion apparatus 26" is shown in FIG. 7 without the fourth longitudinally extending wall 102 and without the fluid inlet tubes 108. The spiral fluid passageways terminate against a discoidal plate 112 that forms the rearward end 52" of the outer vessel 40" and the rearward end 84" of the shroud 80". A feed fluid inlet 114 extends through the third longitudinally extending wall 82" of the shroud 80" and the first longitudinally extending wall 44" of the outer vessel 40" at rearward end of each of the spiral fluid passageways 106. Each of feed fluid inlets 114 thereby creates a fluid path between one of the spiral passageways 106 and the rearward fluid passageway 72.

This embodiment of a combustion apparatus 26" also comprises a pair of spirally wound fuel feed tubes 116 that preferably spiral around the inner conduit 42" aft of discoidal plate 112 of the combustion apparatus. Each of the fuel feed tubes 116 has a forward end 118 that preferably extends through the discoidal plate 112 of the combustion apparatus 26" and that terminates in the rearward fluid passageway 72". As such, it should be appreciated that the fuel feed tubes 116 provide fluid paths for introducing fuel from a fuel source directly into the rearward fluid passageway 72" of the combustion apparatus 26". The fuel feed tubes 116 are preferably formed out of conductive metal and each of the fuel feed tubes preferably has a pair of spaced-apart electrical leads 120 attached thereto for passing an electrical current through a portion of the fuel feed tube. It should be appreciated that the outer surfaces of the fuel feed tubes 116 are preferably coated with non-electrically conductive material to prevent electricity from transferring from one fuel feed tube to another, or from a fuel feed tube to the inner conduit 42 of the combustion apparatus 26". As explained below, the purpose of the electrical leads 120 is to pass electrical current through the fuel feed tubes 116 to thereby heat the fuel feed tubes and the fuel passing therethrough.

The combustion apparatus 26" still further comprises a secondary fuel inlet 122 that extends through the jacket 100, shroud 80", and outer vessel 40" for introducing fuel directly into the forward combustion region 70". Similarly, the combustion apparatus 26" comprises a flame rod 124 that extends through the jacket 100, shroud 80", and outer vessel 40" and into the forward combustion region 70".

Still further, the combustion apparatus 26" preferably comprises an annular gas permeable liner 126 positioned within the inner conduit 42". The gas permeable liner 126 preferably extends longitudinally along at least a portion of the length of the inner conduit 42" and is preferably space radially inward from the inner conduit such that a generally annular fluid passageway 128 is created between the inner conduit and the gas permeable liner. Additionally, a fluid inlet 130 extends through the second longitudinally extending wall 64" of the inner conduit 42" rearwardly of the discoidal plate 112 of the combustion apparatus 26" and is in fluid communication with the fluid passageway 128 between the between the inner conduit and the gas permeable liner 126.

The general operation of the combustion apparatus 26" shown in FIGS. 6 and 7 is similar to the combustion apparatus shown in FIGS. 3-5. However, operational differences do exists. One such difference is that the feed fluid introduced into the combustion apparatus 26" is utilized to cool portions of the combustion apparatus. In particular, the feed fluid initially enters the combustion apparatus 26" through the fluid inlet tubes 108 located at the forward end of the combustion apparatus. The feed fluid then enters the spiral fluid passageways 106 and spirals toward the rearward end of the combustion apparatus 26". While a single fluid inlet tube 108 could be utilized to introduce feed fluid into the combustion apparatus 26", it should be appreciated that utilizing multiple fluid inlet tubes 108 provides for more uniform and balanced fluid flow into the spiral fluid passageways 106. It should also be appreciated that the fluid inlet tubes 108 could be operatively attached to the spiral fluid passageways 106 in a one-to-one manner such that the feed fluid introduce through any one of the fluid inlet tubes would enter only one of the spiral fluid passageways. As the feed fluid travels rearward in the spiral fluid passageways 106, heat transfer from the shroud 80" to the feed fluid occurs through convection. This reduces the operating temperature of the shroud 80", and also ultimately the outer vessel 40". It should also be appreciated that the combustion apparatus 26" needs not necessarily comprise a shroud and that, absent a shroud, the spiral ribs would preferably extend from the first longitudinally extending wall 44 of the outer vessel 40 to the jacket 100 of the combustion apparatus 26" and that the spiral fluid passageways 106 would therefore be partially bound by the outer vessel rather than by the shroud.

As the spiral fluid passageways 106 extend rearwardly, the cross-sectional areas of the spiral fluid passageways preferably decrease slightly. This is preferably achieved by decreasing the pitch of the spiral ribs 104 as they extend rearwardly. This causes the magnitude of the feed fluid flow rate to accelerate as it travels along the spiral fluid passageways 106 and limits and discourages flashback. This also helps maintain a uniform feed fluid flow rate as the feed fluid enters the outer vessel 40. Upon reaching the discoidal plate 112 near the rearward end of the combustion apparatus 26", the feed fluid is channeled through the feed fluid inlets 114 at the rearward end of the spiral fluid passageways 106 and into the rearward fluid passageway 72" within the outer vessel 40 of the combustion apparatus 26". The generally triangular shape of the feed fluid inlets 114 facilitates smooth and uniform flow. It should be appreciated that the spiraling nature of the feed fluid flow in the spiral fluid passageways 106 causes the feed fluid to be introduced into the rearward fluid passageway 72" within the outer vessel of the combustion apparatus 26" in a swirling manner about the inner conduit 42".

Unlike the combustion apparatus shown in FIGS. 3-5, fuel is introduced into the outer vessel 40" of the combustion apparatus 26" of FIGS. 6 and 7 directly and prior to being mixed with oxygenated feed fluid. A conventional fluid inlet tube could be utilized for this purpose. However, the fuel feed tubes 116 of the combustion apparatus 26" described above are particularly configured and adapted for use in connection with the combustion of fuel oil and have several advantages over basic fuel tube inlets. In particular, the fuel feed tubes 116 are configured and adapted to vaporize a mixture of fuel oil and water prior to discharging such mixture into the outer vessel 40" of the combustion apparatus 26". This is done by heating at least portions of the fuel feed tubes 116 upstream of the forward ends 118 of the fuel feed tubes. Two methods of heating such portions of the fuel feed tubes 116 are preferably utilized. One method of heating each of the fuel feed tubes 116 is to apply a voltage across the electrical leads 120 of the fuel feed tube. This causes a current to pass through the fuel feed tube and the electrical resistance of the fuel feed tube causes heat generation. Additionally, as a result of portions of the fuel feed tubes 116 being coiled around the inner conduit 42 of the combustion apparatus 26", heat radiated from the inner conduit is transferred to the fuel feed tubes. It should be appreciated that the temperature of the fuel feed tubes 116 can be controlled by altering the current passing through fuel feed tubes. Additionally, it should be appreciated that utilizing heat transferred from the inner conduit 42" to heat the fuel feed tubes 116 reduces the amount current needed to heat the fuel feed tubes to their desired temperature.

As the mixture of oil and water passes through fuel feed tubes, the mixture is heated and at least some of the water and oil vaporize. The mixture then is preferably discharged into the rearward fluid passageway 72" within the outer vessel 40" adjacent the feed fluid inlets 114 that extend through the outer vessel. Thereafter, the mixture mixes with the oxygenated feed fluid introduced into the rearward fluid passageway 72" through the feed fluid inlets 114. The vaporized state of the fuel mixture prior to its introduction into the outer vessel 40" greatly facilitates the mixing of the fuel mixture with the oxygenated feed fluid within the outer vessel.

To help stabilize combustion within the combustion apparatus 26" and maintain combustion within the forward combustion region 70" of the combustion apparatus, fuel can also be introduced directly into the forward combustion region via the secondary fuel inlet 122. This ensures that combustible fuel flows around the flame rod 124 within the forward combustion region 70" and combusts therein. It should be appreciated that this can be achieved by introducing a relatively small amount of fuel through the secondary fuel inlet 122 as compared to any other primary fuel inlets such as the fuel feed tubes 116 described above.

The gas permeable liner 126 within the inner conduit 42" acts to cool the second longitudinally extending wall 64" of the inner conduit. In particular, bleed-off from the supply of feed fluid is directed into the annular fluid passageway 128 between the between the inner conduit 42" and the gas permeable liner 126 via the fluid inlet 130 that extends through the second longitudinally extending wall 64" of the inner conduit 42". Such bleed-off fluid then passes through the gas permeable liner 126 and into the fluid passageway 68" of the inner conduit 42", and thereby transfers heat away from the second longitudinally extending wall 64" of the inner conduit.

Figure 8:
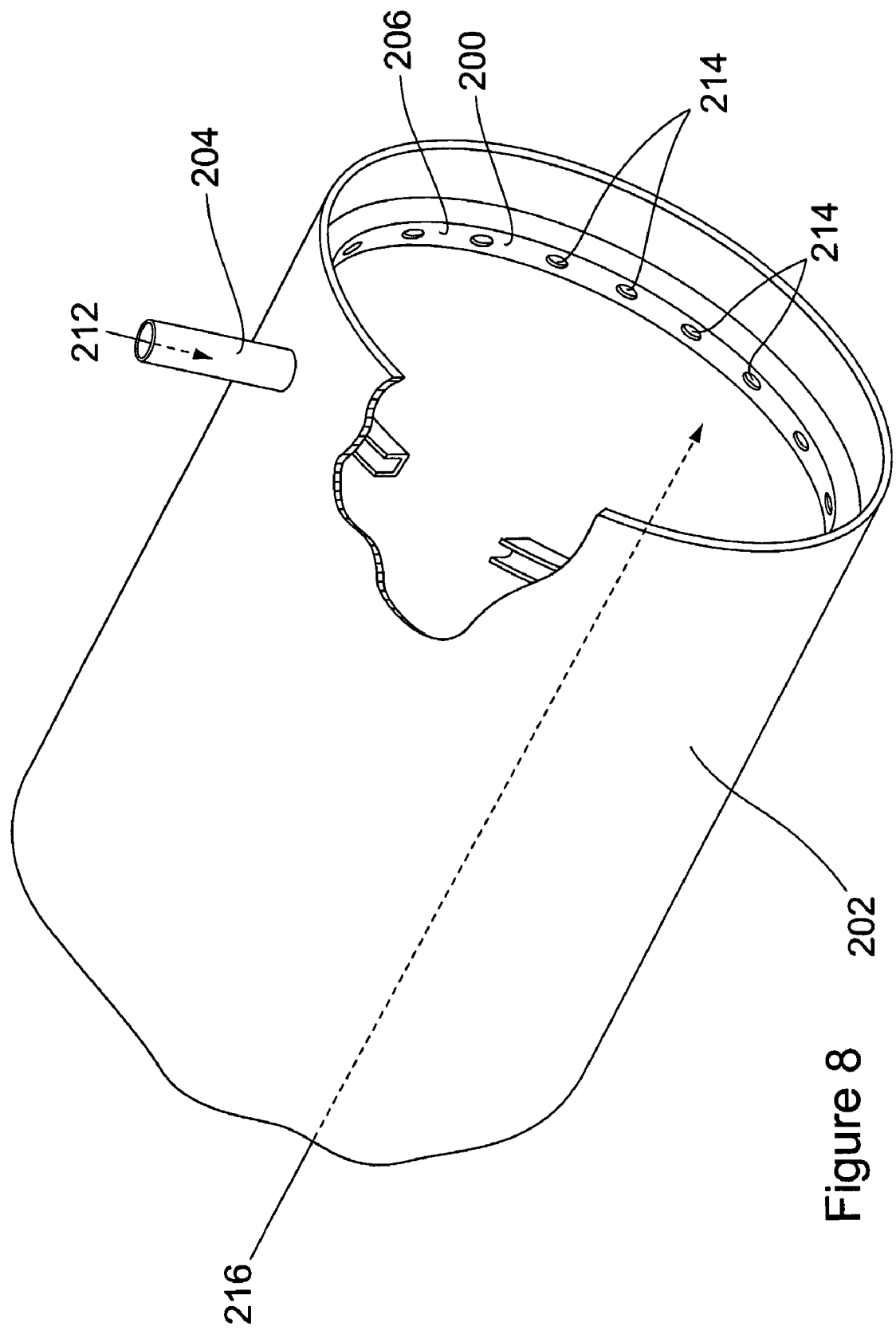
FIG. 8 is a perspective view of a fuel inlet in accordance with another aspect of the invention for use in connection with combustion apparatus.

In another aspect of the invention, a specialized fuel inlet is provided to improve fuel and feed fluid mixing in combustion apparatus where fuel is introduced into a feed fluid inlet, such as is the case with the combustion apparatus shown in FIGS. 3-5. The specialized fuel inlet 200 is shown in a generic tubular feed fluid inlet 202 in FIG. 8. In general, The fuel inlet 200 comprises an upstream fuel delivery tube 204 and an annular ring 206. The upstream fuel delivery tube 204 extends through the wall 208 of the tubular feed fluid inlet 202 and is connected to the annular ring 206. The annular ring 206 comprises an annular channel 210 that is in fluid communication with the fluid passageway 212 of the upstream fuel delivery tube 204. The annular ring 206 also comprises and plurality of openings 214 that provide fluid communication between the annular channel 210 and the fluid passageway 216 of the feed fluid inlet 202. The openings 214 are preferably evenly spaced about the circumference of the annular ring 206 and preferably face perpendicularly toward the center axis of the feed fluid inlet 202.

In use, fuel is pumped or otherwise forced or drawn into the annular channel of the annular ring through the fluid passageway 212 of the upstream fuel delivery tube 204. The fuel then is introduced into the fluid passageway 216 of the feed fluid inlet 202 through the plurality of openings 214 of the annular ring 206. The openings 214 direct the fuel radially inward perpendicular to the flow of oxygenated fluid passing through the feed fluid inlet 202 and thereby facilitate mixing of the fuel and the oxygenated feed fluid. Additionally, this configuration and operation of the fuel inlet 200 facilitates vaporization of fuel (when non-gaseous fuels are being combusted) by dispersing the fuel more evenly throughout the cross-section of the feed fluid inlet 202.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, the term "portion" should be construed as meaning some or all of the item or element that it qualifies.

What is claimed is:

1. A method comprising:
   providing a combustion apparatus, the combustion apparatus comprising an outer vessel, an inner conduit, and a jacket, the outer vessel having a first longitudinally extending wall that defines an internal volume of the outer vessel, the inner conduit providing a first fluid passageway that is in communication with the internal volume of the outer vessel, the jacket at least partially surrounding the outer vessel in a manner defining at least a second fluid passageway between the jacket and the first longitudinally extending wall of the outer vessel, the second fluid passageway extending spirally around the first longitudinally extending wall of the outer vessel and decreasing in cross-sectional area as it extends spirally around the first longitudinally extending wall of the outer vessel;

passing oxygen through the second fluid passageway and into the internal volume of the outer vessel, the decrease in cross-sectional area of the second fluid passageway causing the oxygen that passes through the second fluid passageway to increase in velocity as it passes through the second fluid passageway;

introducing fuel into the internal volume of the outer vessel;

combusting the fuel and oxygen at least partially within the internal volume of the outer vessel of the combustion apparatus, the combustion of the fuel and oxygen producing reaction products;

discharging at least some of the reaction products from the internal volume of the outer vessel of the combustion apparatus via the first fluid passageway of the inner conduit.

2. A method comprising:

providing a combustion apparatus, the combustion apparatus comprising an outer vessel, an inner conduit, and a gas permeable liner, the outer vessel having a first longitudinally extending wall that defines an internal volume of the outer vessel, the inner conduit providing a first fluid passageway that is in communication with the internal volume of the outer vessel, the gas permeable liner being at least partially positioned within the inner conduit in a manner spaced from the inner conduit such that a generally annular second fluid passageway exists between the inner conduit and the gas permeable liner;

introducing fuel and oxygen into the internal volume of the outer vessel;

combusting the fuel and oxygen at least partially within the internal volume of the outer vessel of the combustion apparatus, the combustion of the fuel and oxygen producing reaction products;

discharging at least some of the reaction products from the internal volume of the outer vessel of the combustion apparatus via the first fluid passageway of the inner conduit; and forcing gaseous matter through the gas permeable liner from the second fluid passageway and into the first fluid passageway in a manner limiting the amount of heat absorbed by the inner conduit.

3. A combustion apparatus comprising an outer vessel, an inner conduit, and an annular gas permeable liner, the outer vessel comprising a first longitudinally extending wall that extends generally along a central axis and that defines an internal volume of the outer vessel, the outer vessel further having a forward end and a rearward end, the rearward end being longitudinally spaced from the forward end, the inner conduit circumscribing the central axis and comprising an intake port and at least partially defining a first fluid passageway that is in communication with the internal volume of the outer vessel through the intake port, the intake port being positioned between the forward end and the rearward end of the outer vessel, the first fluid passageway extending through the rearward end of the outer vessel, the gas permeable liner being positioned at least partially within the inner conduit in a spaced-apart manner such that an annular fluid passageway is formed radially between the gas permeable liner and the inner conduit with respect to the central axis.

* * * * *